US011068201B2

(12) United States Patent
Lin

(10) Patent No.: US 11,068,201 B2
(45) Date of Patent: Jul. 20, 2021

(54) FLASH MEMORY CONTROLLER, METHOD FOR MANAGING FLASH MEMORY MODULE AND ASSOCIATED ELECTRONIC DEVICE

(71) Applicant: Silicon Motion, Inc., Hsinchu County (TW)

(72) Inventor: Wen-Sheng Lin, Kaohsiung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/721,931

(22) Filed: Dec. 20, 2019

(65) Prior Publication Data

US 2020/0210101 A1  Jul. 2, 2020

(30) Foreign Application Priority Data

Jan. 2, 2019  (TW) .................................. 108100005

(51) Int. Cl.
*G06F 3/06* (2006.01)
*G06F 12/02* (2006.01)

(52) U.S. Cl.
CPC .......... *G06F 3/0658* (2013.01); *G06F 3/0604* (2013.01); *G06F 3/064* (2013.01); *G06F 3/0679* (2013.01); *G06F 12/0246* (2013.01)

(58) Field of Classification Search
None
See application file for complete search history.

(56) References Cited

U.S. PATENT DOCUMENTS

| 2009/0327591 | A1* | 12/2009 | Moshayedi | G06F 11/1441 |
| | | | | 711/103 |
| 2013/0173844 | A1* | 7/2013 | Chen | G06F 12/0246 |
| | | | | 711/103 |
| 2020/0026646 | A1* | 1/2020 | Lee | G06F 12/0246 |
| 2020/0142619 | A1* | 5/2020 | Ke | G06F 3/0631 |
| 2020/0167089 | A1* | 5/2020 | Natarajan | G06F 3/064 |

FOREIGN PATENT DOCUMENTS

TW  I644210 B  12/2018

* cited by examiner

*Primary Examiner* — Kevin Verbrugge
(74) *Attorney, Agent, or Firm* — Winston Hsu

(57) ABSTRACT

A flash memory controller is disclosed. The flash memory controller is configured to access a flash memory module, wherein the flash memory module includes a plurality of first blocks and a plurality of second blocks, and the flash memory controller includes a microprocessor and a read-only memory storing a program code. When the flash memory controller is powered on, when the flash memory controller is required to write data into the flash memory module, the microprocessor writes the data into the plurality of first blocks only; and the microprocessor writes subsequent data into the second blocks only when a quantity of the plurality of first blocks written by the flash memory controller after power on is greater than a threshold value.

19 Claims, 8 Drawing Sheets

FLASH MEMORY CONTROLLER, METHOD FOR MANAGING FLASH MEMORY MODULE AND ASSOCIATED ELECTRONIC DEVICE

BACKGROUND OF THE INVENTION

1. Field of the Invention

The present invention is related to flash memory controllers.

2. Description of the Prior Art

A flash memory module may have various types of blocks, e.g. two types within Single-Level Cell (SLC) blocks, Multi-Level Cell (MLC) blocks, Triple-Level Cell (TLC) blocks and Quad-Level Cell (QLC) blocks, for performing read/write operations efficiently. Conventionally, when a flash memory controller writes data into the flash memory module, the flash memory controller may write the data into SLC block (s) first, and move valid data within multiple SLC blocks into MLC block(s), TLC block(s) or QLC block(s) afterwards. The advantage of this method is that the data is written into the SLC blocks with high stability and high speed, but the disadvantage is that additional time for moving the data into blocks having higher storage density is required. In another conventional method, when the flash memory controller writes the data into the flash memory module, the flash memory controller may directly write the data into the MLC blocks or the TLC blocks, where the advantage of this method is that time for moving the data is saved, but the speed of writing the data is slower, and data stability of the MLC blocks, TLC blocks or QLC blocks in current 3-dimensional (3D) flash memory architecture is not good. Thus, if abnormal power off occurs (or more severely, continuously occurs), the data that is being written will be damaged, and may further affect the data that has been successfully written before, which causes problems for subsequent data processing.

SUMMARY OF THE INVENTION

Thus, an objective of the present invention is to provide a flash memory controller, where the flash memory controller can write data into Single-Level Cell (SLC) blocks first after a flash memory is powered on, and selectively write data into Multi-Level Cell (MLC) blocks, Triple-Level Cell (TLC) blocks or Quad-Level Cell (QLC) blocks afterwards, in order to efficiently and stably finish write operations of the flash memory.

In an embodiment of the present invention, a flash memory controller is disclosed, wherein the flash memory controller is configured to access a flash memory module. The flash memory module comprises a plurality of first blocks and a plurality of second blocks, and the flash memory controller comprises a read only memory (ROM) configured to store a program code and a microprocessor configured to execute the program code to control access of the flash memory module. When the flash memory controller is powered on, if the flash memory controller is required to write data into the flash memory module, the microprocessor writes the data into the plurality of first blocks only; and the microprocessor writes subsequent data into the plurality of second blocks only when a quantity of the plurality of first blocks written by the flash memory controller after power on is greater than a threshold value.

In another embodiment of the present invention, a method for managing a flash memory module is disclosed, wherein the flash memory module comprises a plurality of first blocks and a plurality of second blocks, and the method comprises: when the flash memory module is powered on, writing data into the plurality of first blocks only; and writing subsequent data into the plurality of second blocks only when a quantity of the plurality of first blocks written after the flash memory module is powered on is greater than a threshold value.

In another embodiment of the present invention, an electronic device is disclosed. The electronic device comprises a flash memory module and a flash memory controller, wherein the flash memory controller comprises a plurality of first blocks and a plurality of second blocks, and the flash memory controller is configured to access the flash memory module. When the electronic device is powered on, if the flash memory controller is required to write data into the flash memory module, the flash memory controller writes the data into the plurality of first blocks only; and the flash memory controller writes subsequent data into the plurality of second blocks only when a quantity of the plurality of first blocks written by the flash memory controller after the electronic device is powered on is greater than a threshold value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
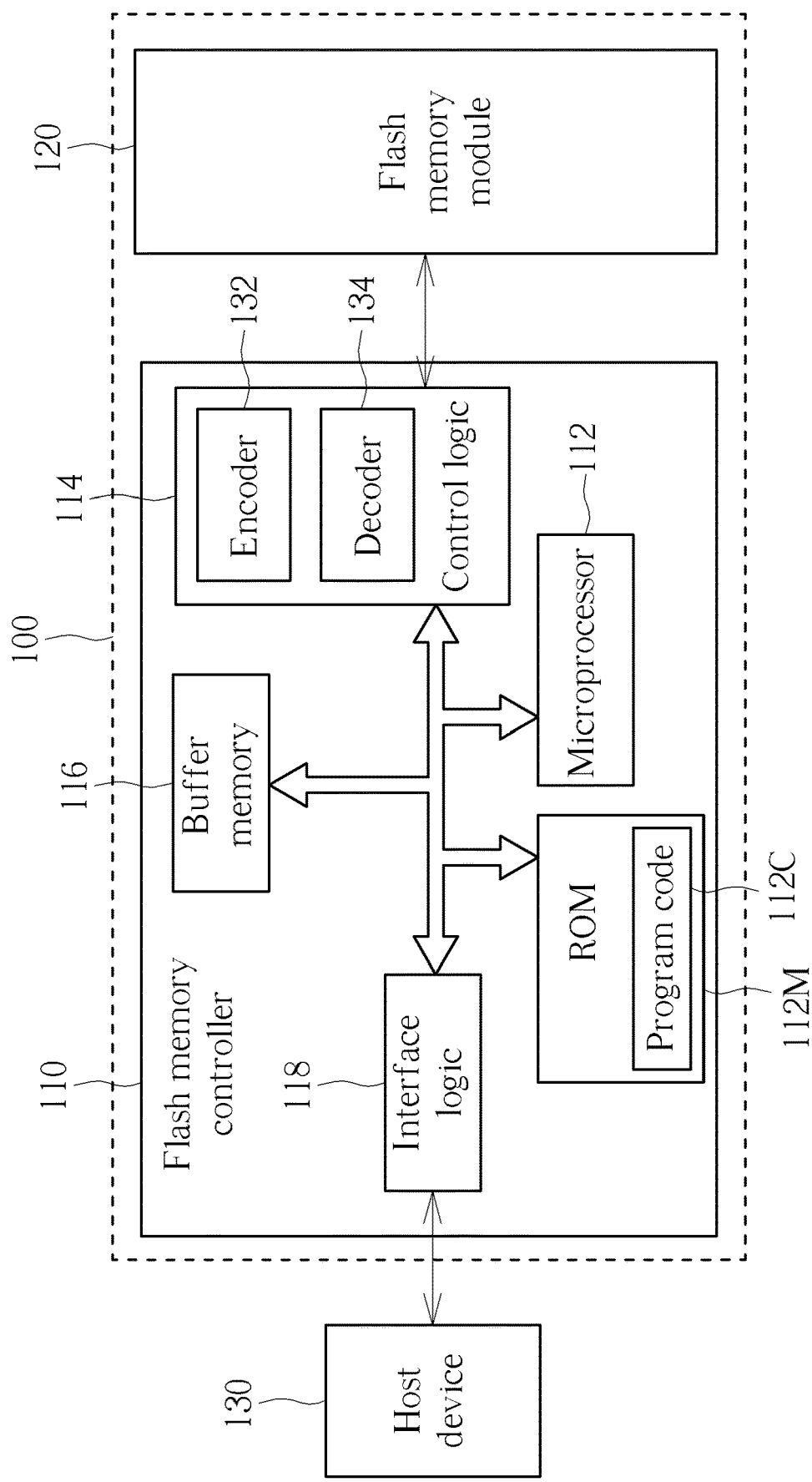
FIG. 1 is a diagram illustrating a memory device according to an embodiment of the present invention.

FIG. 1 is a diagram illustrating a memory device 100 according to an embodiment of the present invention. The memory device 100 comprises a flash memory module 120 and a flash memory controller 110, and the flash memory controller 110 is configured to access the flash memory module 120. According to this embodiment, the flash memory controller 110 comprises a microprocessor 112, a read only memory (ROM) 112M, a control logic 114, a buffer memory 116, and an interface logic 118. The ROM 112M is configured to store a program code 112C, and the microprocessor 112 is configured to execute the program code 112C to control access of the flash memory module 120. The control logic 114 comprises an encoder 132 and a decoder 134, where the encoder 132 is configured to encode data written into the flash memory module 120 in order to generate a corresponding parity (also referred to as an error correction code (ECC)), and the decoder is configured to decode data read from the flash memory module 120.

Typically, the flash memory module 120 comprises a plurality of flash memory chips, and each of the plurality of flash memory chips comprises a plurality of blocks, where the flash memory controller performs erase operations on the flash memory module 120 in the unit of blocks. In addition, a block may record a specific quantity of pages (e.g. data pages), where the flash memory controller 110 performs write operations on the flash memory module 120 in the unit of pages. In this embodiment, the flash memory module 120 is a 3-dimensional (3D) NAND-type flash module.

In practice, the flash memory controller 110 executing the program code 112C through the microprocessor 112 may utilize internal components thereof to perform various control operations, e.g. utilize the control logic 114 to control access operations of the flash memory module (more particularly, access operations of at least one block or at least one page), utilize the buffer memory 116 to perform required buffer processing, and utilize the interface logic 118 to communicate with a host device 130. The buffer memory 116 is implemented by a random access memory (RAM). For example, the buffer memory may be a static RAM (SRAM), but the present invention is not limited thereto.

In an embodiment, the memory device 100 may be a portable memory device (e.g. a memory card conforming to SD/MMC, CF, MS or XD specifications), and the host device 130 may be an electronic device that is connectable with the memory device 100, e.g. a mobile phone, a laptop computer, a desktop computer, etc. In another embodiment, the memory device 100 may be a solid state drive (SSD) or an embedded storage device conforming to Universal Flash Storage (UFS) or Embedded Multi Media Card (EMMC) specifications, which is installed in an electronic device such as a mobile phone, a laptop computer or a desktop computer, and the host device 130 in this embodiment may be a processor of the electronic device.

Figure 2:
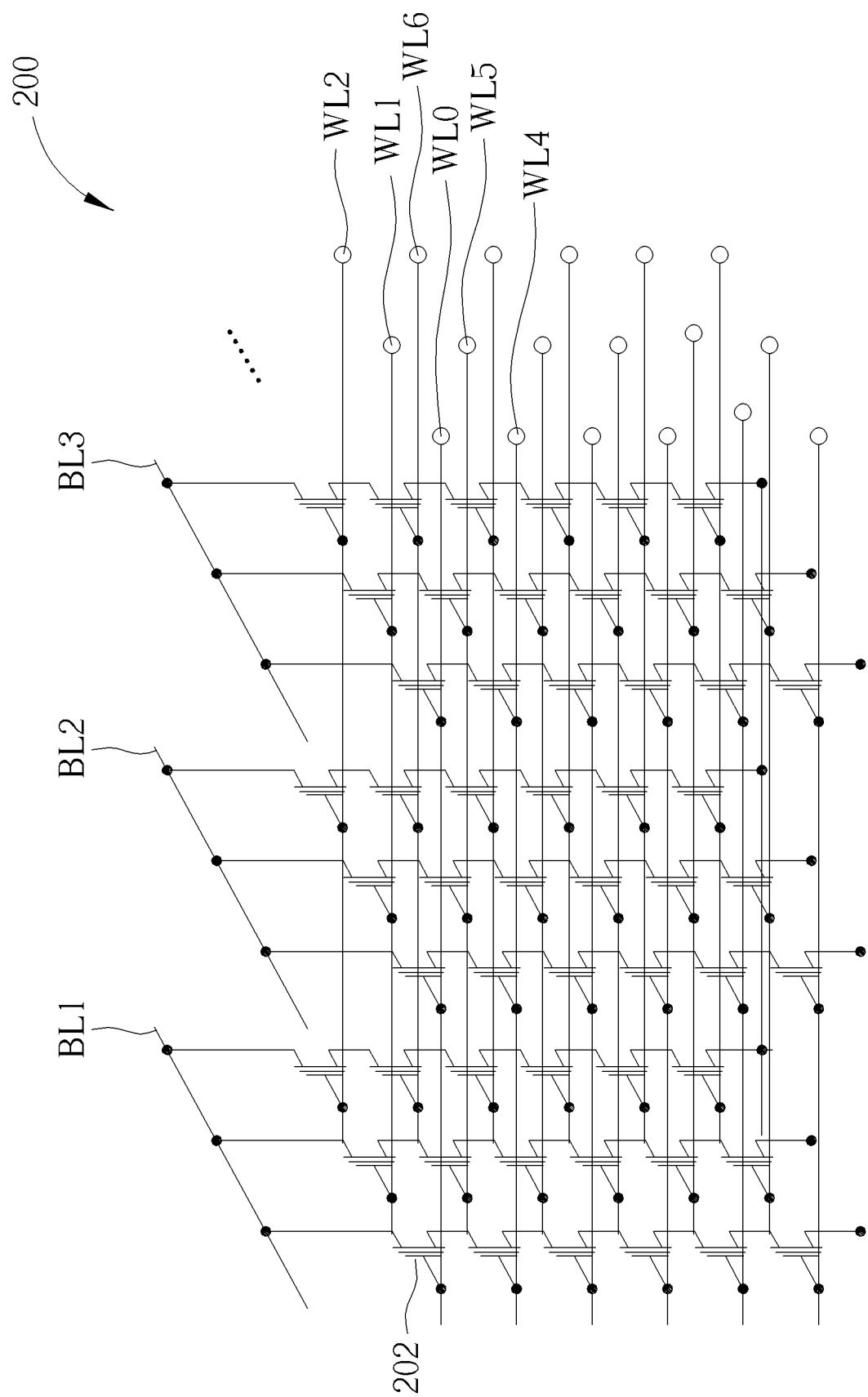
FIG. 2 is a diagram illustrating a block within a flash memory module according to an embodiment of the present invention.

FIG. 2 is a diagram illustrating a block 200 within the flash memory module 120 according to an embodiment of the present invention, where the flash memory module 120 is a 3D NAND-type flash memory. As shown in FIG. 2, the block 200 comprises a plurality of memory units (e.g. floating gate transistors 202 shown in FIG. 2 or other charge trap elements), which form a 3D NAND-type flash memory architecture through a plurality of bit lines (only BL1 to BL3 are depicted in FIG. 2) and a plurality of word lines (e.g. WL0 to WL2, WL4 to WL6). In FIG. 2, taking the top plane as an example, all floating gate transistors on the word line WL0 form at least one page, all floating gate transistors on the word line WL1 form at least another page, and all floating gate transistors on the word line WL2 form yet another page, where the rest may be deduced by analogy. According to different write manners of a flash memory, definitions between the word line WL0 and pages (logical pages) may be different. In detail, when writing in a Single-Level Cell (SLC) manner, all floating gate transistors on the word line WL0 correspond to a single logical page only; when writing in a Multi-Level Cell (MLC) manner, all floating gate transistors on the word line WL0 correspond to two logical pages; when writing in a Triple-Level Cell (TLC) manner, all floating gate transistors on the word line WL0 correspond to three logical pages; and when writing in a Quad-Level Cell (QLC) manner, all floating gate transistors on the word line WL0 correspond to four logical pages. Since those skilled in this art should understand the 3D NAND-type flash memory architecture and relationships between word lines and pages, related descriptions are omitted for brevity.

In the architecture shown in FIG. 2, multiple word lines may be defined as a word line set, and the word line set may share a portion of control circuits. Therefore, when writing data into floating gate transistors on a word line within the word line set fails (write fail), an error in the data of floating gate transistors on other word line (s) within the word line set might occur. In an embodiment, word lines located on a same plane may be set as a word line set. Referring to FIG. 2, assuming that there are four word lines on the same plane, the word lines WL0 to WL3 may be classified into a first word line set, and the word lines WL4 to WL7 may be classified into a second word line set, where the rest may be deduced by analogy. Assume that when the flash memory controller 110 writes data into pages of the first word line set, the flash memory controller 110 sequentially writes the data into the floating gate transistors 202 on the word lines WL0, WL1, WL2 and WL3, and assume that the data is successfully written into the word lines WL0, WL1 and WL2, but a write error occurs during writing data into the word line WL3, i.e. data that is originally successfully written into WL0, WL1 and WL2 may be affected by the errors on the word line WL3 and have errors. In addition, assume that when the flash memory controller 110 writes data into pages of the second word line set, the flash memory controller 110 sequentially writes the data into the floating gate transistors 202 on the word lines WL4, WL5, WL6 and WL7, and assume that an error occurs when writing the data into the word line WL4. In such a situation, the word lines WL5, WL6 and WL7 may become unstable, and will not be suitable for continuing to write data.

Figure 3:
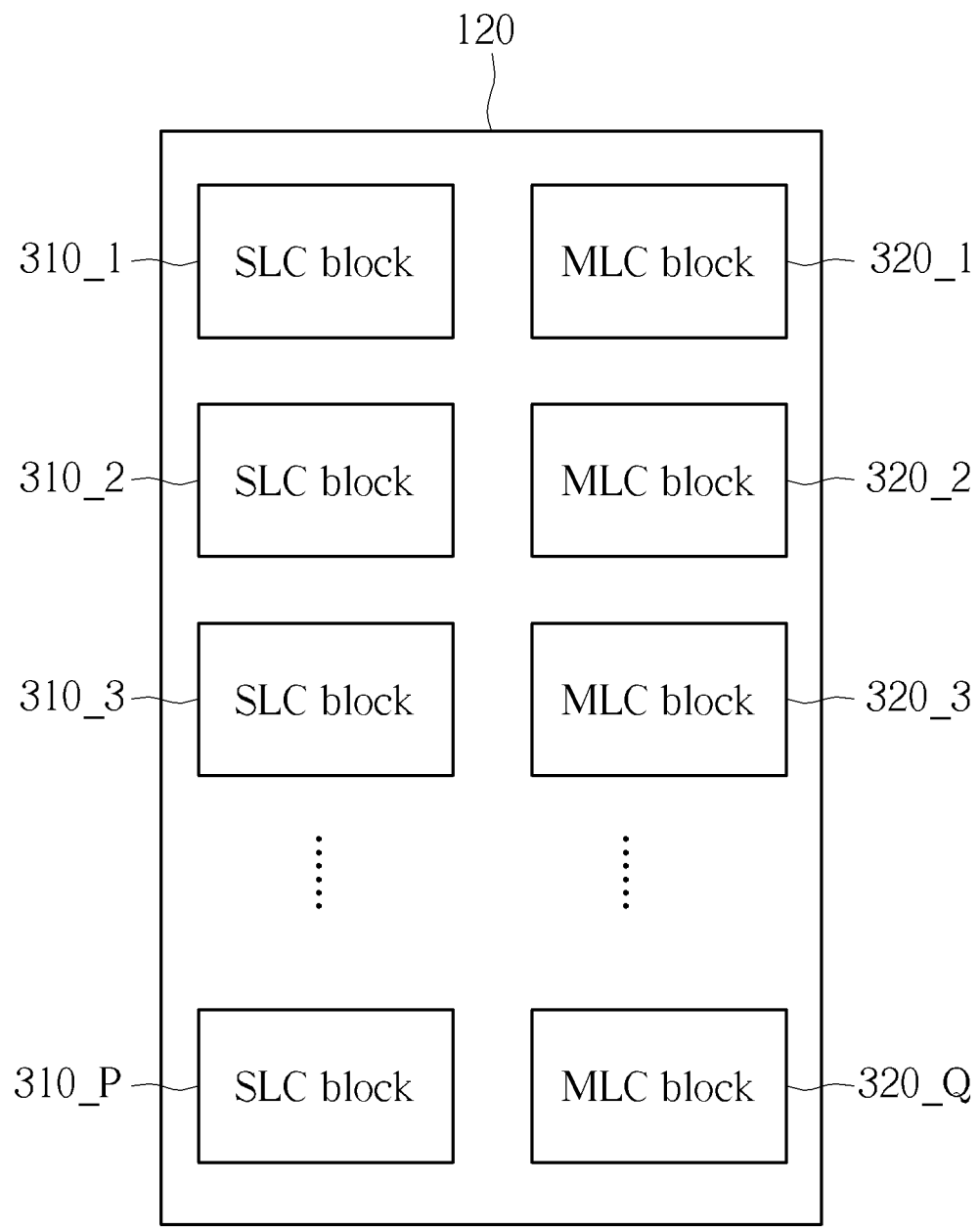
FIG. 3 is a diagram illustrating a plurality of blocks within a flash memory module according to an embodiment of the present invention.

FIG. 3 is a diagram illustrating a plurality of blocks within the flash memory module 120 according to an embodiment of the present invention. As shown in FIG. 3, the flash memory module 120 comprises a plurality of first blocks (taking SLC blocks 310_1 to 310_P as examples in this embodiment) and a plurality of second blocks (taking MLC blocks 320_1 to 320_Q as examples in this embodiment). It should be noted that FIG. 3 is for illustrative purposes only, and the plurality of second blocks may be implemented by TLC blocks or QLC blocks in other embodiments.

Figure 4:
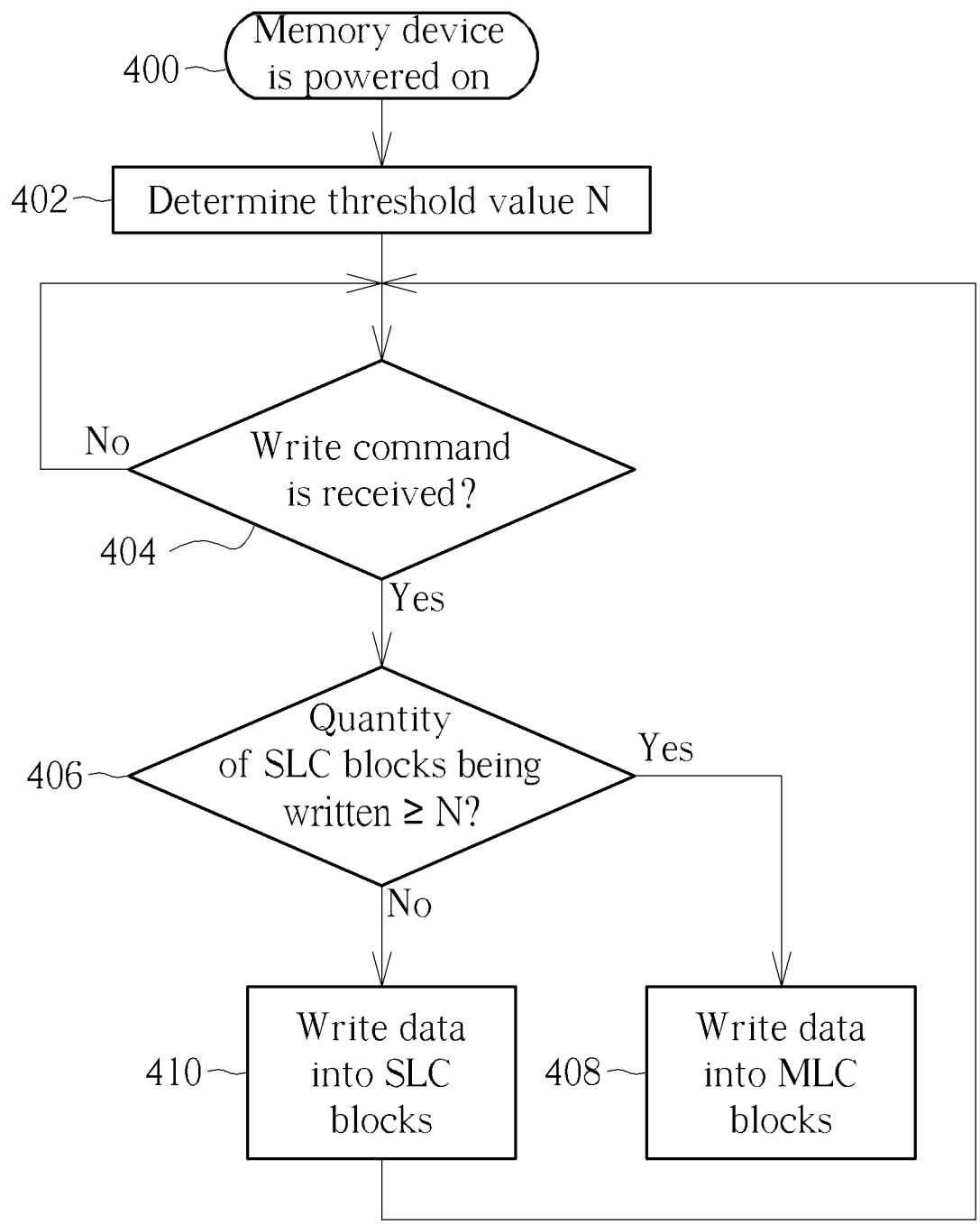
FIG. 4 is a flowchart illustrating management of a flash memory module according to a first embodiment of the present invention.

FIG. 4 is a flowchart illustrating management of the flash memory module 120 according to a first embodiment of the present invention. As shown in FIG. 4, in Step 400, the flash memory controller 110 and the flash memory module 120 are powered on and perform related initialization operations. In Step 402, the microprocessor 112 determines a threshold value N, where the threshold value N is configured to indicate a quantity of SLC blocks within the flash memory module 120 having priority for being used to store data. In Step 404, the flash memory controller 110 determines whether a write command (e.g. a write command from the host device 130, or a write operation inside the memory device 100) is received, if yes, the flow enters Step 406. In Step 406, the microprocessor 112 determines a quantity of SLC blocks written by the flash memory controller 110 after the memory device 100 is powered on in Step 400. If the quantity of SLC blocks having been written is greater than N (or the flash memory controller 110 has written N SLC blocks), the flow enters Step 408 and the microprocessor 112 will write data into MLC blocks 320_1 to 320_Q. If the quantity of SLC blocks having been written is less than N (or the flash memory controller 110 has not written N SLC blocks yet), the flow enters Step 410 and the microprocessor 112 will write data into the SLC blocks 310_1 to 310_P.

For example, assume that the threshold value N is 6. When the flash memory controller 110 needs to write data into the flash memory module 120, in a condition where all the SLC blocks 310_1 to 310_6 are blank blocks, the flash memory controller 110 sequentially writes data into the SLC blocks 310_1 to 310_6 only, and does not perform any write operation on the MLC blocks 320_1 to 320_Q. After all the SLC blocks 310_1 to 310_6 have been written, the flash memory controller 110 may write subsequent data into the MLC blocks 320_1 to 320_Q.

In the embodiment of FIG. 4, since data which needs to be written as soon as the memory device is powered on is usually important system data, the important system data will be written into the SLC blocks 310_1 to 310_P only. Thus, the important system information can be written in a fast manner, and stability of such data can be high. In addition, after the quantity of SLC blocks being written reaches the threshold value N, the flash memory controller 110 may write data into MLC blocks 320_1 to 320_Q which have higher storage density, in order to increase usage rate of the flash memory module 120.

Figure 5:
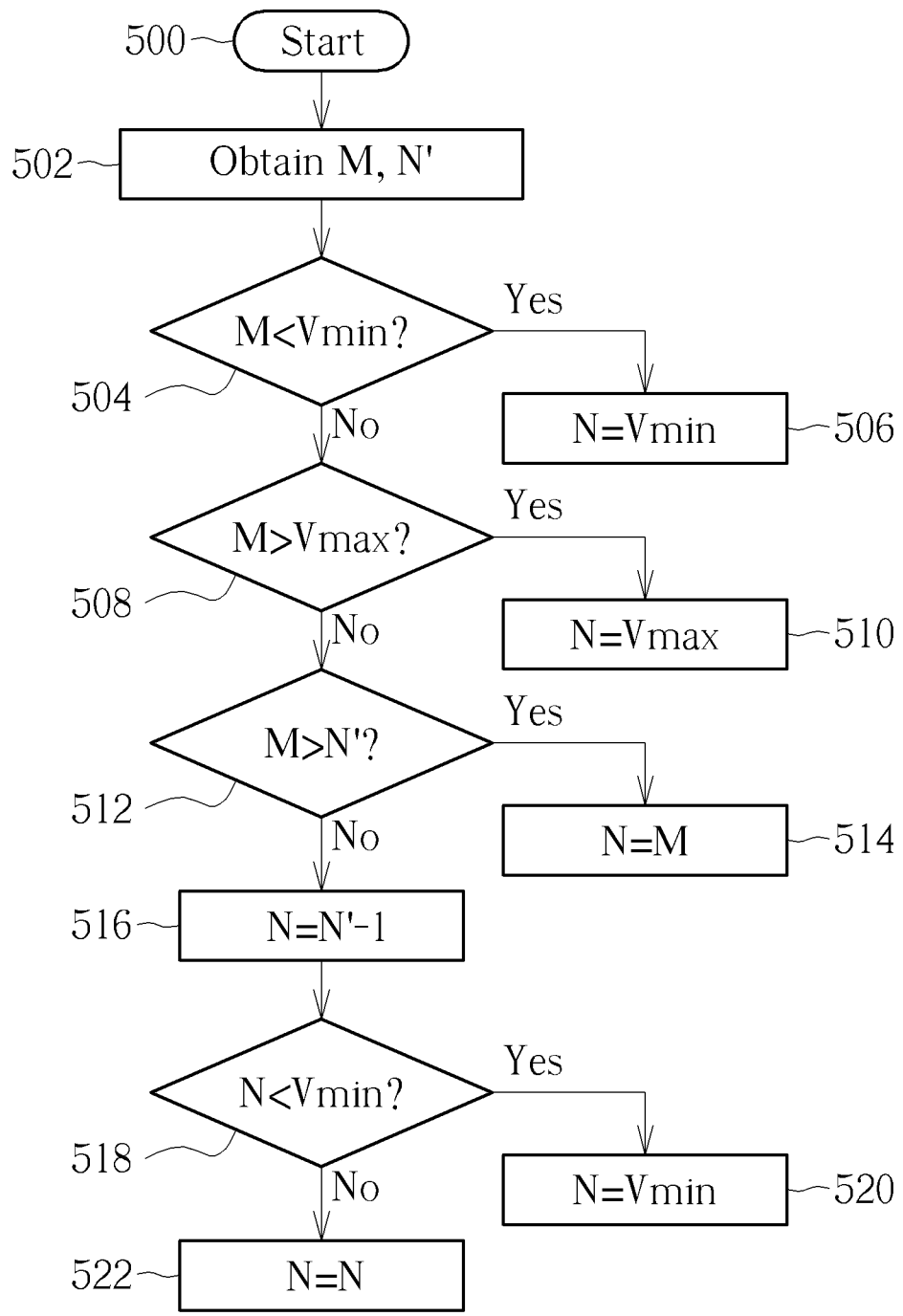
FIG. 5 is a flowchart of determining a threshold value according to an embodiment of the present invention.

In an embodiment, the threshold value N determined in Step 402 shown in FIG. 4 may be a variable value, and the microprocessor 112 may generate the threshold value N according to a previous threshold value set by the flash memory controller before power on and a total block count of blocks written by the flash memory controller 110 during an operation period before power on (e.g. a total block count of blocks written during a previous process from the flash memory module 120 being powered on to the flash memory module 120 being powered off). Refer to FIG. 5, which is a flowchart for determining the threshold value, as follows.

Step 500: the flow starts.

Step 502: obtain a previous threshold value N' set by the flash memory controller 110 before power on, and a total block count M of blocks written by the flash memory controller 110 during an operations period before power on.

Step 504: determine whether the total block count M is less than a lower bound Vmin. If yes, the flow enters Step 506; if no, the flow enters Step 508.

Step 506: set the threshold value N to be the lower bound Vmin.

Step 508: determine whether the total block count M is greater than the upper bound Vmax. If yes, the flow enters Step 510; if no, the flow enters Step 512.

Step 510: set the threshold value N to be the upper bound Vmax.

Step 512: determine whether the total block count M is greater than the previous threshold value N'. If yes, the flow enters Step 514; if no, the flow enters Step 516.

Step 514: set the threshold value N to be the total block count M.

Step 516: set the threshold value N to be the previous threshold value N' minus one.

Step 518: determine whether the threshold value N is less than the lower bound Vmin. If yes, the flow enters Step 520; if no, the flow enters Step 522.

Step 520: set the threshold value N to be the lower bound Vmin.

Step 522: set the threshold N to be the threshold N determined by Step 516.

Taking an example for illustrating the embodiment of FIG. 5, assume that the lower bound Vmin of the threshold value N is 2, the upper bound Vmax of the threshold value N is 10, and the previous threshold value N' set by the flash memory controller 110 before power on is 6. If the total block count M of blocks written by the flash memory controller 110 during an operation period before power on is any value within an interval [0, 2], the microprocessor 112 may set the threshold value N to be the lower bound Vmin (i.e. "2") as mentioned in Step 506 or Step 520; if the total block count M of blocks written by the flash memory controller 110 during an operation period before power on is 10 or any value greater than 10, the microprocessor 112 may set the threshold value N to be the upper bound Vmax (i.e. "10") as mentioned in Step 510; if the total block count M of blocks written by the flash memory controller 110 during an operation period before power on is any value within an interval [7, 10], the microprocessor 112 may set the threshold value N to be M as mentioned in Step 514; and if the total block count M of blocks written by the flash memory controller 110 during an operation period before power on is any value within an interval [2, 5], the microprocessor 112 may set the threshold value N to be (N'-1) (i.e. "5") as mentioned in Step 516.

According to the flow shown in FIG. 5, the most suitable threshold value N can be determined according to actual operations of the memory device 100. If many blocks are written after the memory device 100 is powered on in a previous write operation, the threshold value N may be increased to make SLC blocks have a higher priority for having data written when the memory device is powered on next time; and if fewer blocks are written after the memory device 100 is powered on in a previous write operation, the threshold value N may be reduced to make fewer SLC blocks written when the memory device is powered on next time.

It should be noted that the embodiment shown in FIG. 3 may be applied to a condition of power recovery after abnormal power off. In an embodiment, the flow shown in FIG. 3 may be performed under a condition of power recovery after abnormal power off only. For example, referring to FIG. 6, assuming that power off recovery (POR) or sudden power off recovery (SPOR) occurs when the flash memory controller 110 is writing data to the MLC block 320_1, after the flash memory controller 110 is powered on, the flash memory controller 110 may determine whether abnormal power off occurs and execute the flow shown in FIG. 3 under a condition where abnormal power off occurs.

In an embodiment, when the flash memory controller 110 and the flash memory module 120 are powered on, the flash memory controller 110 may scan the last block written before power on in order to determine data quality, and accordingly determine whether abnormal power off occurred previously, e.g. determine whether the flash memory controller 110 underwent abnormal power off in a previous write operation according to whether data of each data page within the MLC block 320_1 is decodable. In the embodiment shown in FIG. 6, since a data page P45 within the MLC block 320_1 is not decodable, the flash memory controller 110 may determine that abnormal power off did occur in a previous write operation.

In another embodiment, under a condition where the memory device 100 is powered off normally, the flash memory controller 110 may store multiple temporary storage tables and data stored in the buffer memory 116 into the flash memory module 120, including a flag indicating whether the memory device 100 is powered off normally. Thus, the flash memory controller 110 may read the aforementioned flag stored in the flash memory module 120 after power on to determine whether the memory device 100 undergoes abnormal power off, e.g. determine power off occurs when the aforementioned flag is not correctly set.

Figure 6:
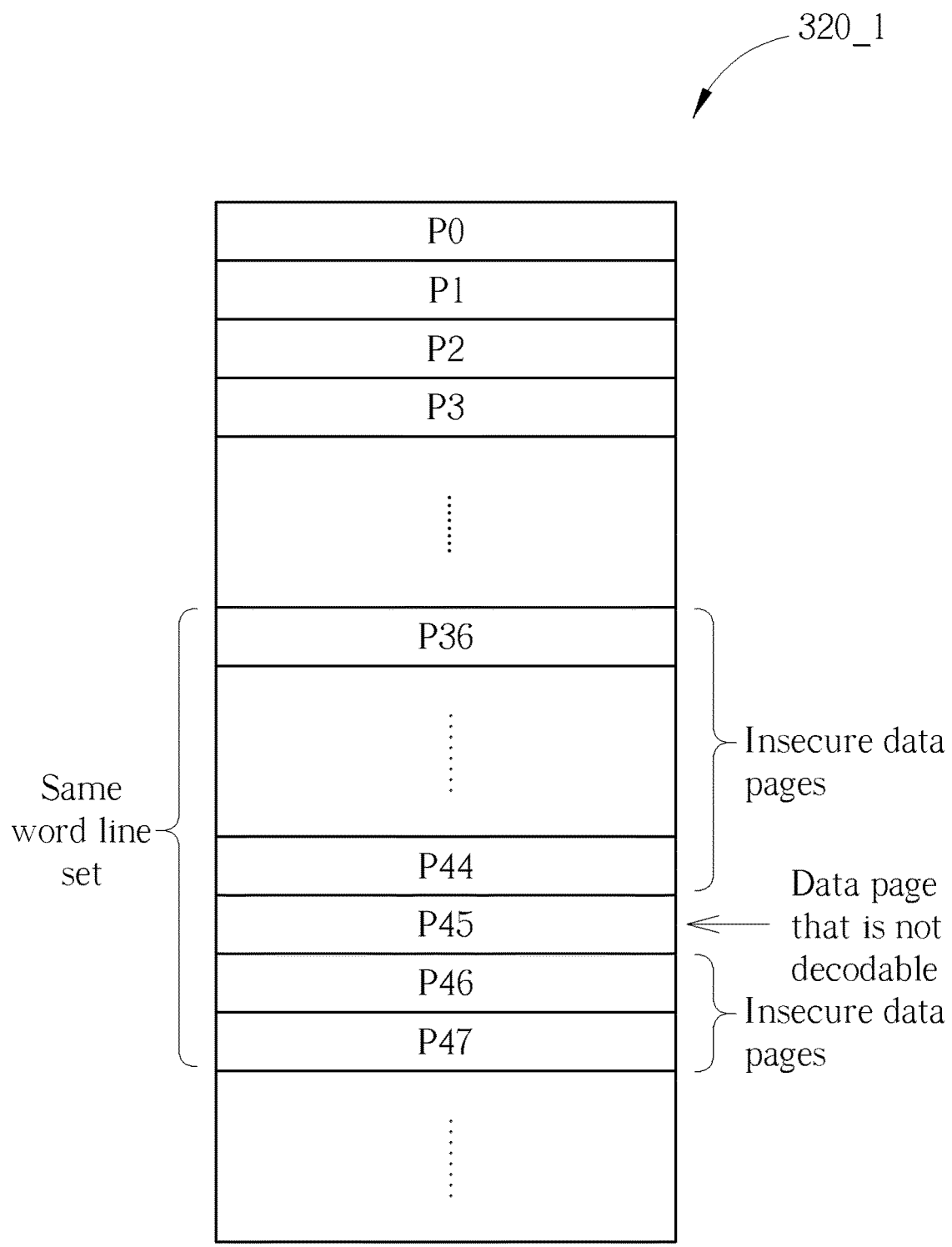
FIG. 6 is a diagram of determining data pages within a specific block to be not decodable and insecure.
Figure 7:
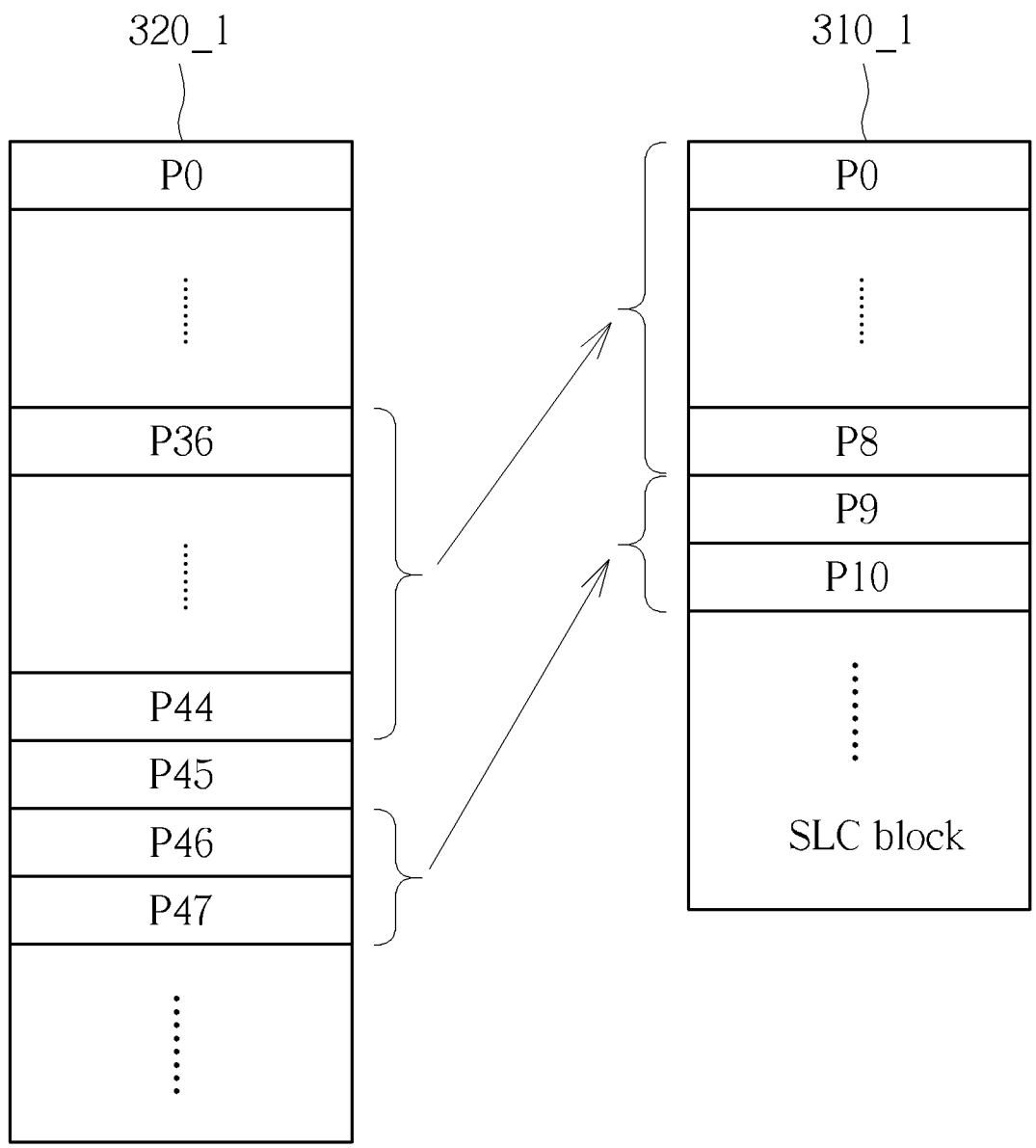
FIG. 7 is a diagram of moving insecure data pages within an MLC block to an SLC block.

In the embodiment shown in FIG. 6, since the MLC block 320_1 undergoes an abnormal power off, data within some data pages may become unstable, which might cause further data loss. In an example, data pages P36 to P44 and P46 to P47, which belong to a same word line set as the data page P45 that is not decodable, may become unstable. The flash memory controller 110 may need to move data within these unstable data pages to other blocks. Referring to FIG. 7, since the flash memory controller 110 can only write data into SLC blocks immediately after power on, the flash memory controller 110 may move data within the data pages P36 to P44 within the MLC block 320_1 to data pages P0 to P8 within the SLC block 310_1. In addition, assuming that the data pages P46 to P47 are blank data pages, since data pages which belongs to the same word line as the data page P45 are insecure data pages, the microprocessor 112 may write dummy data into these blank data pages P46 to P47 and/or all data pages of a next word line set, in order to make data quality of the whole MLC block 320_1 more stable.

Figure 8:
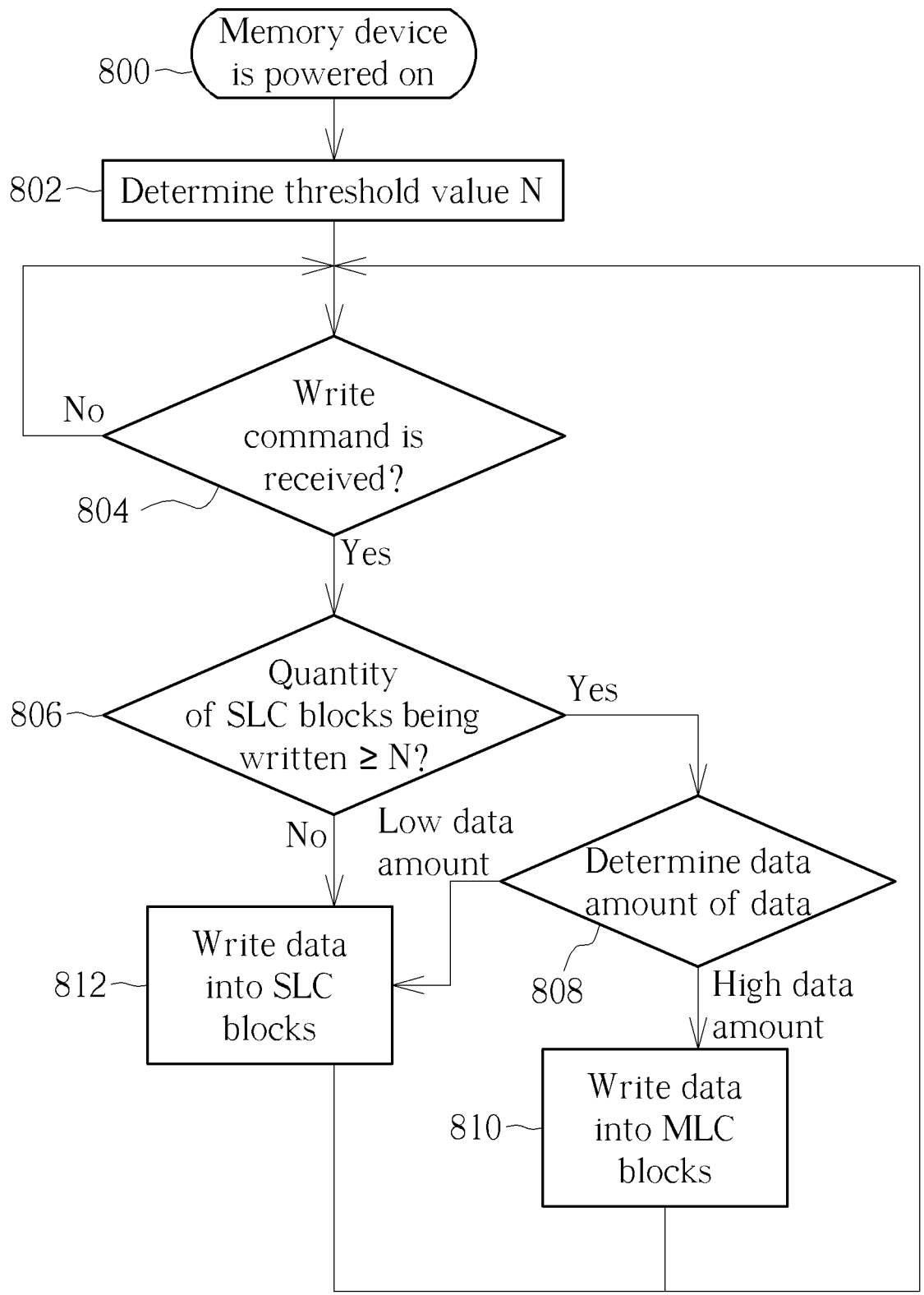
FIG. 8 is a flowchart illustrating management of a flash memory module according to a second embodiment of the present invention.

FIG. 8 is a flowchart illustrating management of the flash memory module 120 according to a second embodiment of the present invention. As shown in FIG. 8, in Step 800, the flash memory controller 110 and the flash memory module 120 are powered on and perform related initialization operations. In Step 802, the microprocessor 112 determines the threshold value N, where the threshold value N is configured to indicate a quantity of SLC blocks within the flash memory module 120 having priority for storing data. In Step 804, the flash memory controller 110 determines whether a write command (e.g. a write command from the host device 130, or a write operation inside the memory device 100) is received; if yes, the flow enters Step 806. In Step 806, the microprocessor 112 determines a quantity of SLC blocks written by the flash memory controller 110 after the memory device 100 is powered on in Step 800. If the quantity of SLC blocks having been written is greater than N (or the flash memory controller 110 has written N SLC blocks), the flow enters Step 808. If the quantity of SLC blocks having been written is less than N (or the flash memory controller 110 has not written N SLC blocks yet), the flow enters Step 812. In Step 808, the microprocessor 112 determines a data amount of data to be written into the flash memory module 120. If this data is determined to be a high data amount (e.g. multiple data pages), the flow enters Step 810 and the microprocessor 112 will write data into MLC blocks 320_1 to 320_Q. If this data is determined to be a low data amount (e.g. 4 kilobytes), the flow enters Step 812 and the microprocessor 112 will write data into the SLC blocks 310_1 to 310_P.

In the embodiment of FIG. 8, since data which needs to be written as soon as the memory device is powered on is usually important system data, the important system data will be written into the SLC blocks 310_1 to 310_P only. Thus, the important system information can be written in a fast manner, and stability of such data can be high. In addition, after the quantity of SLC blocks being written reaches the threshold value N, the flash memory controller 110 may write a portion of data having a low data amount into the SLC blocks 310_1 to 310_P in order to avoid wasting data page space, and write a portion of data having a high data amount into the MLC blocks 320_1 to 320_Q in order to enhance the usage rate of the flash memory module 120.

The threshold value N determined in Step 802 shown in FIG. 8 may be a variable value, and a generating method thereof can be according to the embodiment shown in FIG. 5.

Briefly summarized, the flash memory controller and related management method of the present invention can write data into SLC blocks first after the flash memory is powered on, and then selectively write data into MLC blocks, TLC blocks or QLC blocks afterwards in order to finish write operations of the flash memory efficiently and stably. In addition, a quantity of SLC blocks that needs to be written when the flash memory is powered on every time may be determined according to previous operations in order to meet the actual usage conditions of the memory device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller configured to access a flash memory module comprising a plurality of first blocks and a plurality of second blocks, comprising:
   a read only memory (ROM), configured to store a program code; and
   a microprocessor, configured to execute the program code to control access of the flash memory module;
   wherein when the flash memory controller is powered on, when the flash memory controller is required to write data into the flash memory module, the microprocessor writes the data into the plurality of first blocks only; and the microprocessor writes subsequent data into the plurality of second blocks only when a quantity of the plurality of first blocks written by the flash memory controller after power on is greater than a threshold value;
   wherein when a last block written by the flash memory controller before power on is a specific second block within the plurality of second blocks and the specific second block still has remaining pages for writing, when the flash memory controller is powered on, the microprocessor writes data into the plurality of first blocks when the flash memory controller is required to write the data into the flash memory module.

2. The flash memory controller of claim 1, wherein the plurality of first blocks are Single-Level Cell (SLC) blocks, and the plurality of second blocks are Multi-Level Cell (MLC) blocks, Triple-Level Cell (TLC) blocks or Quad-Level Cell (QLC) blocks.

3. The flash memory controller of claim 1, wherein when the quantity of the plurality of first blocks written by the flash memory controller after power on is greater than the threshold value, the microprocessor determines whether to write the subsequent data into the plurality of first blocks or the plurality of second blocks according to a data amount of the subsequent data.

4. The flash memory controller of claim 3, wherein when the data amount of the subsequent data is determined to be a low data amount, the microprocessor writes the subsequent data into the plurality of first blocks; and
   when the data amount of the subsequent data is determined to be a high data amount, the microprocessor writes the subsequent data into the plurality of second blocks.

5. The flash memory controller of claim 4, wherein the plurality of first blocks are Single-Level Cell (SLC) blocks, and the plurality of second blocks are Multi-Level Cell (MLC) blocks, Triple-Level Cell (TLC) blocks or Quad-Level Cell (QLC) blocks.

6. The flash memory controller of claim 1, wherein under a condition where abnormal power off occurs before the flash memory controller is powered on, when the flash memory controller is powered on, the microprocessor moves data of at least one portion of pages within the specific second block that are decodable to a temporary storage block and writes dummy data into blank pages belonging to a same word line set as pages that are not decodable or that belong to an adjacent word line set.

7. The flash memory controller of claim 1, wherein the threshold value is a variable value.

8. A flash memory controller configured to access a flash memory module comprising a plurality of first blocks and a plurality of second blocks, comprising:
   a read only memory (ROM), configured to store a program code; and
   a microprocessor, configured to execute the program code to control access of the flash memory module;
   wherein when the flash memory controller is powered on, when the flash memory controller is required to write data into the flash memory module, the microprocessor writes the data into the plurality of first blocks only; and the microprocessor writes subsequent data into the plurality of second blocks only when a quantity of the plurality of first blocks written by the flash memory controller after power on is greater than a threshold value;
   wherein the microprocessor generates the threshold value according to a total block count of blocks written by the flash memory controller during an operation period before power on.

9. The flash memory controller of claim 8, wherein the microprocessor generates the threshold value according to a previous threshold value set by the flash memory controller before power on and the total block count of blocks written by the flash memory controller during the operation period before power on; and when the total block count is greater than the previous threshold value, the microprocessor sets the threshold value to be greater than the previous threshold value; and when the total block count is less than the previous threshold value, the microprocessor sets the threshold value to be less than the previous threshold value.

10. The flash memory controller of claim 9, wherein the threshold value has an upper bound and a lower bound, and when the total block count is greater than the previous threshold value and the total block count is less than the upper bound, the microprocessor sets the threshold value to be the total block count; and when the total block count is greater than the previous threshold value and the total block count is greater than the upper bound, the microprocessor sets the threshold value to be the upper bound.

11. The flash memory controller of claim 9, wherein the threshold value has an upper bound and a lower bound, and when the total block count is less than the previous threshold value, the microprocessor sets the threshold value to be less than the previous threshold value but not less than the lower bound.

12. A method for managing a flash memory module comprising a plurality of first blocks and a plurality of second blocks, the method comprising:
   when the flash memory module is powered on, writing data into the plurality of first blocks only; and
   writing subsequent data into the plurality of second blocks only when a quantity of the plurality of first blocks written after the flash memory module is powered on is greater than a threshold value;
   wherein when a last block written by a flash memory controller before power on is a specific second block within the plurality of second blocks and the specific second block still has remaining pages for writing, when the flash memory module is powered on, writing data into the plurality of first blocks when the flash memory controller is required to write the data into the flash memory module.

13. The method of claim 12, wherein the plurality of first blocks are Single-Level Cell (SLC) blocks, and the plurality of second blocks are Multi-Level Cell (MLC) blocks, Triple-Level Cell (TLC) blocks or Quad-Level Cell (QLC) blocks.

14. The method of claim 12, wherein the step of writing the subsequent data into the plurality of second blocks comprises:
   only when the quantity of the plurality of first blocks written after the flash memory module is powered on is greater than the threshold value, determining whether to write the subsequent data into the plurality of first blocks or the plurality of second blocks according to a data amount of the subsequent data.

15. The method of claim 14, wherein the step of determining whether to write the subsequent data into the plurality of first blocks or the plurality of second blocks according to the data amount of the subsequent data comprises:
   when the data amount of the subsequent data is determined to be a low data amount, writing the subsequent data into the plurality of first blocks; and
   when the data amount of the subsequent data is determined to be a high data amount, writing the subsequent data into the plurality of second blocks.

16. An electronic device, comprising:
   a flash memory module, comprising a plurality of first blocks and a plurality of second blocks; and
   a flash memory controller, configured to access the flash memory module;
   wherein when the electronic device is powered on, when the flash memory controller is required to write data into the flash memory module, the flash memory controller writes the data into the plurality of first blocks only; and the flash memory controller writes subsequent data into the plurality of second blocks only when a quantity of the plurality of first blocks written by the flash memory controller after the electronic device is powered on is greater than a threshold value;
   wherein when a last block written by the flash memory controller before power on is a specific second block within the plurality of second blocks and the specific second block still has remaining pages for writing, when the flash memory controller is powered on, the flash memory controller writes data into the plurality of first blocks when the flash memory controller is required to write the data into the flash memory module.

17. The electronic device of claim 16, wherein the plurality of first blocks are Single-Level Cell (SLC) blocks, and the plurality of second blocks are Multi-Level Cell (MLC) blocks, Triple-Level Cell (TLC) blocks or Quad-Level Cell (QLC) blocks.

18. The electronic device of claim 16, wherein when the quantity of the plurality of first blocks written by the flash memory controller after the electronic device is powered on is greater than the threshold value, the flash memory controller determines whether to write the subsequent data into the plurality of first blocks or the plurality of second blocks according to a data amount of the subsequent data.

19. The electronic device of claim 18, wherein when the data amount of the subsequent data is determined to be a low data amount, the flash memory controller writes the subsequent data into the plurality of first blocks; and when the data amount of the subsequent data is determined to be a high data amount, the flash memory controller writes the subsequent data into the plurality of second blocks.

* * * * *